Dec. 15, 1942.  C. M. KENDRICK  2,304,831
FLUID PRESSURE CONTROL
Original Filed Jan. 14, 1939
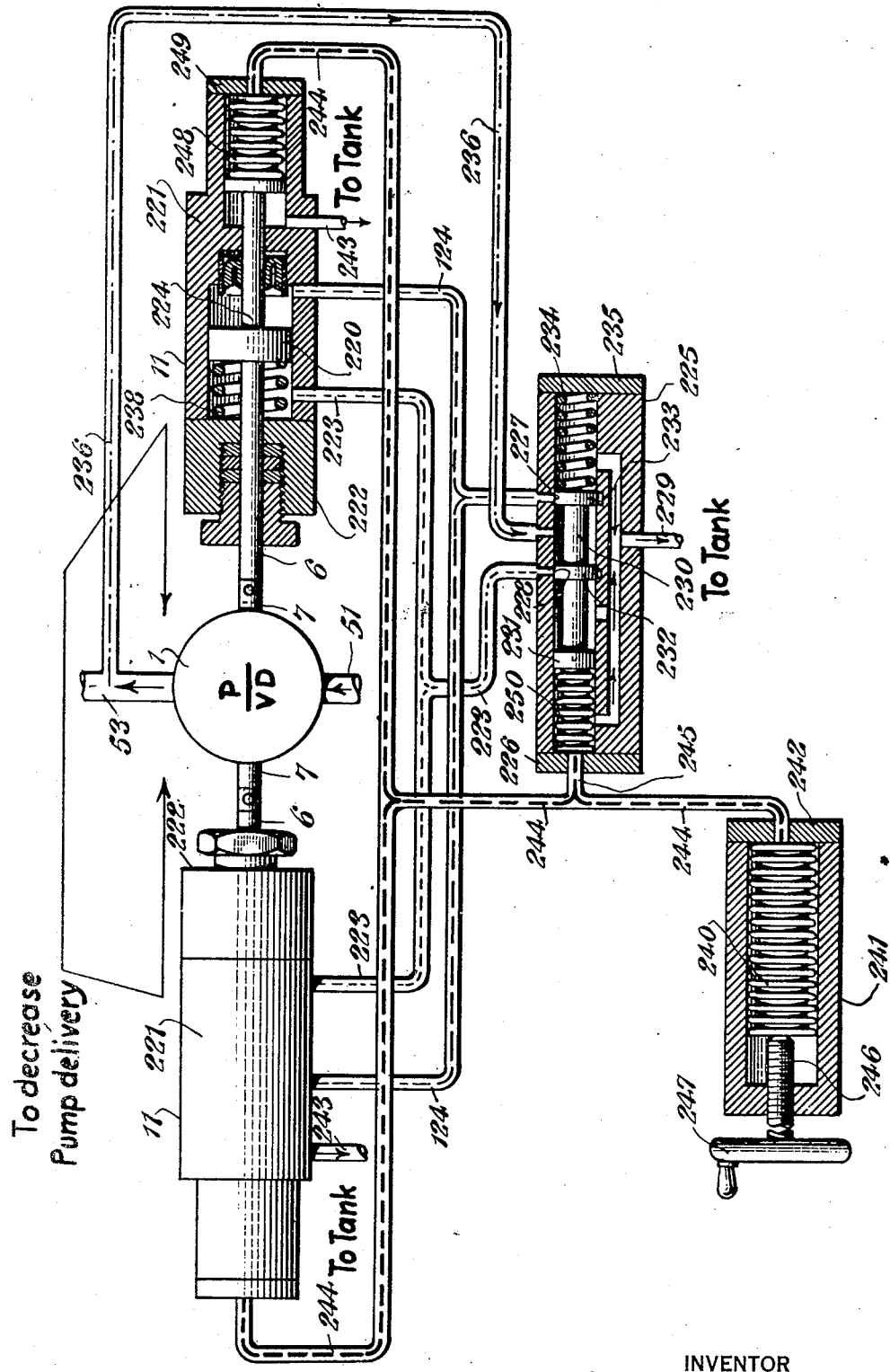
INVENTOR
Charles M. Kendrick
BY
Bartlett, Eype, Keel & Weymouth
ATTORNEYS Patented Dec. 15, 1942

2,304,831

UNITED STATES PATENT OFFICE 2,304,831

FLUID PRESSURE CONTROL

Charles M. Kendrick, New York, N. Y., assignor to Manly Corporation, Washington, D. C., a corporation of Delaware Original application January 14, 1939, Serial No. 250,864. Divided and this application April 5, 1941, Serial No. 386,999

7 Claims. (Cl. 103—38)

This application is a division of co-pending application filed January 14, 1939, Serial No. 250,864.

The invention relates to control systems and particularly to the power or servo motor control of means to be actuated.

One object of the invention is such a system embodying simple, novel and improved hydraulic follow-up control means. Another object is to provide follow-up control means of this character in which there is substantially no lost motion, thus making the control very sensitive. Another object is to provide follow-up control means of this character having a closed fluid circuit including Sylphon bellows with the parts thereof so arranged that leakage or escape of fluid from said circuit is practically impossible. A further object is to provide improved follow-up control means in which the fluid in its closed hydraulic control circuit is kept substantially constant at a predetermined pressure whenever the parts thereof are not functioning to produce change in adjustment or the like of the device controlled thereby and in which parts of said hydraulic follow-up control means function responsive to departures of the pressure in its circuit from said predetermined amount to cause such movement or adjustment of the controlled device that the corresponding movement of other parts of the hydraulic follow-up means correctively alter the pressure in its circuit and restore it to said predetermined amount. Other and more specific objects will appear from the description which follows.

The invention will be understood from consideration of the accompanying drawing which illustrates, by way of example, partly in section and partly in diagrammatic arrangement, an embodiment of the invention employed to control the output of a multi-section variable delivery pump, but it will be understood that the invention is capable of other embodiments and may be employed for any use for which follow-up control means of this general character are suited.

Referring now to the drawing, I have shown the novel and improved hydraulic follow-up means of the present invention as employed to control the output per revolution of the driving member of a "double" or "double acting" variable delivery pump I comprising two "pumping sections" of parts. Pumps of this character are well known in the art and the internal structure of the pump I forms no part of the present invention. It may be, for example, of the type disclosed in my co-pending application filed January 14, 1939, Serial Number 250,864, of which the present application is a division, and which has since matured into Patent No. 2,038,062, or it may be of one of the types shown in United States Patents Nos. 2,141,170 and 2,141,171 or of any other suitable type. The pump I is provided with an inlet conduit 51 through which fluid is supplied to both of said pump's two pumping sections and said pump is also provided with a discharge conduit 53 into which the output of both pumping sections is delivered.

The pump I has a pair of laterally movable adjusting rods 6 which control the outputs of its two pumping sections. Each adjusting rod 6 is attached to its adjusting piston 220 by which it is moved and its position controlled. Each adjusting piston 220 is slidably fitted within the bore of its adjusting cylinder 221 which is closed on its inner end (that is, its end adjacent the pump I) by an end cover 222, the piston rod of each adjusting piston passing through a suitable opening in the corresponding end cover 222 and appropriate packing being provided to prevent leakage. Each adjusting piston 220 is also provided with a rod 224 extending outwardly therefrom, the purpose of which will be presently explained, the rod 224 passing through an opening in the closed outer end of its adjusting cylinder 221 which is suitably packed to prevent leakage. While only one adjusting cylinder 221 is shown in section together with its adjusting piston 220 and associated parts, it will be understood that both adjusting cylinders 221 are of identical construction.

The branched passage 124, which connects the outer ends of the adjusting cylinders 221, leads to and connects with an annular cylinder port 227 in the bore of the valve housing 225 and similarly the branched passage 223, which connects the inner ends of said adjusting cylinders, leads to and connects with an annular cylinder port 228 in the bore of the valve housing 225.

A valve piston 230 is slidably fitted within the bore of the valve housing 225 and is formed with three heads, 231, 232 and 233 respectively. The arrangement and proportions are such that the heads 232 and 233 cover the cylinder ports 228 and 227 respectively when the valve piston 230 occupies its neutral position in which it is shown thus cutting off communication between the valve bore of the housing 225 and both ends of the adjusting cylinders 221. Movement of the valve piston 230 to the right of its neutral position connects the cylinder port 227 with the supply of pressure fluid, which is admitted through the passage 236 from any suitable source such as the discharge conduit 53, and simultaneously connects the cylinder port 228 with the exhaust passage 229. Pressure fluid is then admitted to the outer ends of the adjusting cylinders 221 and the adjusting pistons 220 are moved in an inward or delivery-decreasing direction. In the same manner, movement of the valve piston 230 to the left of its neutral position admits pressure fluid to the cylinder port 228 and the inner ends of the adjusting cylinders 221 so that the adjusting pistons 220 are moved in an outward or delivery-increasing direction.

The valve piston 230 is moved responsive to action of my novel and improved hydraulic follow-up which will now be described. It includes an element which is adjustable at will and which is here shown as an expansible Sylphon bellows 240 mounted in the bore of a containing member 241 in such manner that the parts thereof may move freely as the axial length of said bellows 240 is extended and contracted. The right hand end of the bellows 240 abuts against the end cover 242 of the container 241 and is provided with a suitable connection by which the interior of said bellows 240 is connected with a branched passage 244. The other end of the bellows 240 terminates in a rigid end piece adapted to bear against the end of a screw 246 which extends through a threaded opening in the closed end of the container 241 and which is provided with a handwheel 247 by which it may be rotated. Rotation of the handwheel 247 in one direction advances the screw 246 into the bore of the container 241, causing the bellows 240 to contract in axial length so that the volumetric capacity of its interior is reduced. Rotation of the handwheel 247 in the other direction withdraws the screw 246 from the bore of the container 241 and permits the bellows 240 to extend its axial length and thus increase the volumetric capacity of its interior, this extending movement of the bellows 240 taking place under the influence of its spring-like property and the force exerted by any fluid pressure that may exist therein.

The branched ends of the passage 244 lead to and connect with the interiors of a pair of smaller expansible Sylphon bellows 248, one of which is located in a suitable bore formed in the extended outer end of each adjusting cylinder 221. The outer end of each bellows 248 is held against outward movement by the cylinder and cover 249 and the other end thereof terminates in a rigid end piece adapted to abut against the end of the rod 224 of the adjusting piston 220. The rigid end piece of each bellows 248 moves in unison with movement of its rod 224, outward movement of the rod 224 obviously causing corresponding outward movement of the abutting rigid end piece of the bellows 248 and, upon inward movement of said rod, said rigid end piece being moved inward by the spring-like property of the bellows and by the force exerted by any fluid pressure that may exist therein, so that the position of the corresponding adjusting piston 220 determines the axial length of said bellows 248 and hence the volumetric capacity of its interior. The interiors of the two bellows 248 are connected with the ends of the branched passage 244 and their sizes are such that changes in their combined interior volumetric capacities incident to movement of the adjusting pistons 220 between their extreme inward and outward position is equal to or less than the maximum change which can be made in the volumetric capacity of the interior of the bellows 240 by rotation of the handwheel 247.

A passage 245 leads from the branched passage 244 and connects with the interior of another expansible Sylphon bellows 250 positioned in the left hand end of the bore of the valve housing 225. The left end of the bellows 250 abuts against the end cover 226 of the valve housing 225 and the right end thereof terminates in a rigid end piece abutting against the end of the head 231 of the valve piston 230. The right hand end of the valve bore contains a compression spring 234, one end of which abuts against the valve housing's end cover 235 and the other end of which abuts against the adjacent end of the valve piston 230.

The interiors of the bellows 240, the two bellows 248, the bellows 250 and their connecting fluid passages 244 and 245 are filled with a substantially non-compressible fluid, such as oil or glycerine, and comprise the closed hydraulic follow-up circuit, the parts of which are preferably connected in sealed relationship with one another (as by soldering) in order to prevent the leakage of fluid therefrom.

Upon rotation of the handwheel 247 in the direction which decreases the axial length of the bellows 240 and the volumetric capacity of the interior thereof, some of the fluid therein will be forced out into the branched passage 244. The rods 224 present greater resistance to movement than can be overcome by the force thus exerted thereon through the bellows 248 and hence the volumetric capacities of said bellows 248 will not change in initial response to movement of the handwheel 247. The spring 234 presents relatively small resistance, however, so that fluid displaced from the bellows 240 by rotation of the handwheel will enter the bellows 250, increasing its axial length and moving the valve piston 230 out of its neutral position and toward the right as viewed in the drawing.

As already explained, movement of the valve piston to the right of its neutral position causes movement of the adjusting pistons 220 in an inward or delivery-decreasing direction, thus reducing the output of the pump 1. The bellows 248 will expand simultaneously with this inward movement of the adjusting pistons 220 and their interior capacities will be increased conformably with the extent of movement of said adjusting pistons 220 and the rods 224, permitting the entry of an amount of fluid equal to the increase thus produced in their combined volumetric capacities. This inward movement of the adjusting pistons 220 and simultaneous expansion of the bellows 248 will continue as long as the handwheel 247 is rotated in the direction which contracts the axial length of the bellows 240 until, of course, the adjusting pistons 220 reach their extreme inward positions and the output of the pump 1 is reduced to its minimum. When rotation of the handwheel is stopped, the adjusting pistons 220 will continue to move for a very slight distance and the valve piston 230, under influence of the spring 234, will move toward the left, contracting the bellows 250 and forcing fluid therefrom into the interior of the two bellows 248. This movement of the valve piston 230 toward the left continues until said valve piston is restored to its neutral position and the adjusting pistons 220 are again rendered inoperative. While described progressively, these movements take place almost instantaneously and there is no "lag" except the extremely small amount incident to movement of the valve piston 230.

Rotation of the handwheel 247 in the opposite direction permits expansion in the axial length of the bellows 240 and increase in its volumetric capacity. The spring 234 then moves the valve piston 230 away from its neutral position and toward the left as the axial length of the bellows 250 is slightly contracted and a small amount of fluid is emitted therefrom. As already explained, this movement of the valve piston 230 causes movement of the adjusting pistons 220 in an outward or delivery-increasing direction so that the output of the pump 1 is increased. Restoring movement of the valve piston 230 to its neutral position takes place when the handwheel 247 is stopped and fluid from the bellows 248 is forced into the bellows 250.

From the foregoing it will be clear that the valve piston 230 is moved out of its neutral position, in one direction or the other, responsive to movement of the handwheel 247, which movement of the valve piston causes movement of the adjusting pistons 220, and that said valve piston 230 is restored to its neutral position by responsive movement of said adjusting pistons 220. It will also be clear that the volume of fluid admitted jointly to or exhausted jointly from the two bellows 248 is always exactly equal to the change in volumetric capacity of the bellows 240 so that a definite combined movement of the two adjusting pistons 220 results from each extent of movement of the handwheel 247, this resulting movement of the adjusting piston 220 producing a substantially definite change in the combined outputs of the two pumping sections of the pump 1 when the operating conditions of the latter remain unchanged. Division of this movement between the two adjusting pistons 220 is immaterial as the combined outputs of the two pumping sections is unaffected thereby when said two pumping sections are of equal maximum capacities or outputs and when change in the output of each pumping section is directly proportional to the distance through which its corresponding adjusting rod 6 is moved, as here presumed for simplicity of explanation. Restoration of the valve piston 230 to its neutral position is likewise unaffected by unequal movement of the adjusting pistons 220, this restoration taking place whenever the changes in the combined volumetric capacities of the two bellows 248 equals the change in the volumetric capacity of the bellows 240, regardless of whether the volumetric capacities of the two bellows 248 are changed in equal or unequal amounts.

In a similar manner the follow-up acts to correct for any displacement of the adjusting pistons 220 which could alter the output of the pump 1 from the output corresponding to any particular position in which the handwheel is held stationary. For example, with the handwheel 247 stationary, if one of the adjusting pistons 220 moves outwardly, as because of leakage or otherwise, and the other adjusting piston likewise moves outwardly or remains stationary, an increase in the output of the pump 1 would result unless corrective action is set in motion. Such movement of one or both adjusting pistons 220 will, however, cause corresponding contraction of the axial length and volumetric capacity of the bellows 248, and the fluid thus forced out of the bellows 248 will enter the bellows 250, moving the valve piston 230 out of its neutral position and toward the right. This movement of the valve piston 230 will cause the adjusting pistons 220 to move in an inward or delivery-decreasing direction until the combined volumetric capacities of the two bellows 248 again equal the proper amount as determined by the bellows 240 and the handwheel 247, when the valve piston 230 will again be restored to its neutral position, this corrective action also having reduced the output of the pump 1 to the amount as determined by the position of the handwheel 247. Corrective movement of the adjusting pistons 220 is thus brought about whenever the combined capacities of the two bellows 248 is either increased or decreased by movement of one or both of the adjusting pistons which does not occur responsive to movement of the handwheel 247. The follow-up therefore functions not only to produce a substantially definite output per volution of the driving member of the pump 1 for each position of the handwheel 247, but also functions to continuously maintain such output.

The handwheel 247 may thus be rotated to cause any desired change in the capacity of the bellows 240 and hence to cause any desired output of the pump 1 so that the output of said pump 1 may be infinitely varied from minimum to maximum. The output of the pump 1, comprising the combined outputs of its two pumping sections, may thus be accurately controlled throughout the entire range of its adjustment. This control, which is effected independent of definite control of the output of either of the two pumping sections and without control of the division of the combined outputs between the two sections (except, of course, at maximum and minimum outputs), is accomplished by a single control valve common to both adjusting cylinders 221 and which regulates the joint operation of both adjusting pistons 220 by regulating the fluid volume admitted jointly to and expelled or exhausted jointly from both of said adjusting cylinders 221.

Springs 238 are provided in the inner ends of the adjusting cylinders 221 to furnish means for moving the adjusting pistons 220 outward when the output of the pump 1 is reduced to a minimum which is zero. These springs 238 are compressed as the adjusting pistons 220 move into positions corresponding to zero output of their pumping sections and the energy thus stored is available to move the adjusting pistons to cause the pump 1 to again deliver fluid.

My improved hydraulic follow-up has many advantages. One of these is that it is free from lost motion as the spring 234 takes up all "play" between the parts and continuously maintains a substantially constant pressure in the follow-up circuit. The parts are inexpensive and may be made of relatively light material as they are subject to no load except that due to the pressure in the follow-up circuit, which pressure is never high and cannot, in fact, exceed the amount determined by the spring 234; the parts are protected against the application of any external fluid pressure by the drain or exhaust connections 243 in the bores housing the two bellows 248 and the exhaust connection adjacent the bellows 250 in the bore of the valve housing 225. Another and important advantage of my hydraulic follow-up is that the manually movable control member (that is the bellows 240 and the handwheel 247) and the control valve may be separated from the pump 1 or from each other to any desired extent, thus facilitating convenient location of the manual control member and making the follow-up well suited for use as a remote control.

From the foregoing it will also be understood that the spring 234 maintains in the hydraulic circuit of the follow-up control means (that is to say, in the Sylphon bellows 240, 248 and 250 and in the passages 244 and 245 which connect said bellows) a substantially constant predetermined pressure whenever the handwheel 247 of the follow-up control means and the adjusting pistons 220 are not moving. Increase in pressure in the hydraulic circuit of the follow-up causes displacement of the valve piston 230 toward the right against the resistance of the spring 234, which in turn causes inward movement of the adjusting pistons 220 as previously explained; the length and volumetric capacity of the bellows 248 is thus increased, thereby reducing the pressure in the hydraulic circuit of the follow-up until said pressure is restored to the above-mentioned predetermined amount, the spring 234 then restoring the valve piston 230 to its neutral position and stopping the movement of the adjusting pistons 220. Similarly, decrease in the pressure of the fluid in the hydraulic circuit of the follow-up below the above-mentioned predetermined amount permits the spring 234 to move the valve piston 230 to the left of its neutral position, causing the adjusting pistons 220 to move outward; such outward movement of the adjusting pistons 220 decreases the length and volumetric capacity of the bellows 248, thus increasing the pressure of the fluid in the hydraulic circuit of the follow-up, this increase in pressure continuing until the pressure in said circuit is restored to the above-mentioned pre-determined amount and the valve piston 230 being restored to its neutral position upon the restoration of the predetermined pressure in said circuit. The spring 234 thus functions to determine the pressure that is maintained in the hydraulic circuit of the follow-up when the parts thereof and the adjusting pistons 220 are not moving and, upon departures from the predetermined pressure and responsive to such departures, the control functions to cause movement of the adjusting pistons 220 in a direction and to an extent such that the corresponding movement and change in volumetric capacity of the bellows 248 results in restoring the predetermined pressure value in said circuit.

The bellows 240, 248 and 250 and the passages 244 and 245 connecting said bellows thus form a closed hydraulic circuit, the parts of which may be connected with each other in such manner that leakage or escape of fluid therefrom is virtually impossible. The pressures existing in this circuit are determined by the spring 234 as already explained, so that the internal pressures in said circuit are relatively low and insufficient to cause failure of the parts comprising said circuit.

The hydraulic follow-up control means of the present invention may also be employed in connection with spring-loaded piston arrangements in which the movement of the piston is controlled entirely by regulating the admission of pressure fluid to and emission of pressure fluid from one end of the cylinder. For example, the spring 238 may be employed to move the adjusting piston 220 outward against the pressure existing in the outer end of the cylinder 221, the movement of the piston then being controlled by the volume of pressure fluid permitted to enter the outer end of the cylinder 221 or the volume of fluid permitted to escape therefrom, this fluid admission and escape being regulated and controlled by the valve piston 230. With this modified arrangement the branch passage 223 may be omitted or connected with a reservoir to permit the escape of any fluid leaking past the piston 220 from the outer end of the cylinder; the annular cylinder port 228, the head 231 and the reduced portion of the valve piston intermediate the heads 231 and 232 may then also be omitted, thus simplifying the structure and reducing its size as the end of the bellows 250 will then be adapted to bear against the adjacent end of the head 232.

It is to be understood that the foregoing is merely an exemplifying disclosure and that other changes, some of which have been indicated, may be made in the apparatus without departing from the applicant's invention as defined in the appended claims. For example, the hydraulic follow-up control means of the present invention may be employed in arrangements having only one bellows 248, or its equivalent, whose volumetric capacity is altered conformably with change in position of the controlled device. Or the hydraulic follow-up circuit may include two or more bellows whose volumetric capacity may be altered at will to cause adjustment or movement of the controlled device; for instance, in a "single acting" pump comprising only one pumping section, one adjusting rod 7, cylinder 221, piston 220 and associated parts would not be required and could therefore be omitted, and the bellows 248 therefor could then be provided with manual or other means by which its volumetric capacity could be altered at will to cause movement of the single adjusting piston 220 which would be employed with this modified arrangement. Control of the output of a variable delivery pump forms one important use for the hydraulic follow-up control means of the present invention but it is to be understood that said hydraulic follow-up control means may be employed for other uses and to control the operation of any controlled device for which follow-up control means of this general class are suited.

I claim:

1. In control means for a power-operated device, means movable at will to cause operation of said device, a closed hydraulic control circuit responsively sensitive to movement of said means and to operation of said device and having a Sylphon bellows, said bellows having an open end forming the connection between the interior of said bellows and the other parts of said circuit and said bellows also having a closed end, a control element movable to control operation of said device and arranged to bear against the closed end of said bellows and force-exerting means arranged to continuously urge said control element against the closed end of said bellows and to maintain pressure in said circuit.

2. In hydraulic follow-up control means for a controlled device, a first chamber of variable volumetric capacity, means for altering the volumetric capacity of said first chamber, a second chamber of variable volumetric capacity, means active to alter the volumetric capacity of said second chamber conformably with and responsive to operation of the controlled device, a third chamber of variable volumetric capacity, the volumetric capacity of said third chamber being altered upon change in volumetric capacity of said first and second chambers, a control element arranged to move responsive to change in volumetric capacity of said third chamber and active to regulate the operation of said controlled device, means connecting said chambers with one another to form a closed hydraulic circuit and means arranged to maintain a substantially constant predetermined pressure in said circuit during the time that the volumetric capacities of all of said chambers remain constant, departure from said predetermined pressure in said circuit being accompanied by change in the volumetric capacity of said third chamber and said control element being responsively moved in a direction to cause operation of the controlled device in a direction and to an extent to effect corrective change in the volumetric capacity of said second chamber to thereby restore the predetermined pressure in said circuit.

3. In hydraulic follow-up control means for a controlled device, a plurality of Sylphon bellows connected with one another to form a closed hydraulic circuit, means for adjusting the volumetric capacity of one of said bellows, a control member movable upon responsive change in the volumetric capacity of another of said bellows and active to regulate the operation of the controlled device, means active to alter the volumetric capacity of another of said bellows conformably with extent of operation of said control device, and means for continuously maintaining pressure greater than atmospheric pressure in said circuit.

4. In control means for a power-operated device, a closed hydraulic control circuit comprising at least two chambers of variable volumetric capacity, means establishing a predetermined pressure value to exist in all parts of said circuit including both of said chambers when the capacites of all chambers thereof remain constant, an element movable to control the operation of said power-operated device, said element having a neutral position in which said power-operated device is rendered inoperative and being movable from said neutral position responsive to pressure in said circuit above said predetermined value to cause operation of said power-operated device in one direction and movable responsive to pressure in said circuit below said predetermined value to cause operation of said power-operated device in the opposite direction, means for altering the pressure in said circuit relative to said predetermined pressure value and means responsive to operation of said power-operated device and active to correctively alter the capacity of one of said chambers to restore said predetermined pressure value in said circuit.

5. In control means for an hydraulic-power-operaed device, a closed hydraulic control circuit comprising at least two chambers of variable volumetric capacity, means establishing a predetermined pressure value to exist in all parts of said circuit including both of said chambers during the time that the capacities of all chambers thereof remain constant, a valve element movable to control the flow of operating pressure fluid to and the exhaust of fluid from said device to thereby control its operation, said valve element having a neutral position in which said device is rendered inoperative and being movable from said neutral position responsive to pressure in said circuit above said predetermined value to cause operation of said device in one direction and movable responsive to pressure in said circuit below said predetermined value to cause operation of said device in the opposite direction, means for altering the pressure in said circuit relative to said predetermined pressure value and means responsive to operation of said device and active to correctively alter the capacity of one of said chambers to restore said predetermined pressure value in said circuit.

6. In power operated means for regulating the output of a variable capacity pump, said pump having an element movable in one direction to increase its capacity and movable in the opposite direction to decrease its capacity and a fluid pressure operated motor for moving said element, in combination, a first chamber of variable volumetric capacity, means for altering the volumetric capacity of said first chamber, a second chamber of variable volumetric capacity, means active to alter the volumetric capacity of said second chamber conformably with and responsive to operation of said fluid pressure operated motor, a third chamber of variable volumetric capacity, the volumetric capacity of said third chamber being altered upon change in volumetric capacity of said first and second chambers, control valve means arranged to move responsive to change in volumetric capacity of said third chamber and active to regulate the operation of said fluid pressure operated motor, means connecting said chambers with one another to form a closed hydraulic circuit and spring means arranged to maintain a substantially constant predetermined pressure in said circuit during the time that the volumetric capacities of all of said chambers remains constant, departure from said predetermined pressure in said circuit being accompanied by change in the volumetric capacity of said third chamber and said control valve means being responsively moved in a direction to cause operation of the fluid pressure operated motor in a direction and to an extent to effect corrective change in the volumetric capacity of said second chamber to thereby restore the predetermined pressure in said circuit.

7. The combination of power operated means to be controlled, a device for controlling the supply of power to said means, said device in one position supplying power to said means and in another position disconnecting power from said means, and a sealed hydraulic circuit responsive to movement of said means and said device including a bellows whose volumetric capacity is variable responsive to the movement of said means, and another bellows whose volumetric capacity is variable responsive to variations of pressure in the circuit and operative to move said control device, said second named bellows holding said device in a position to disconnect the power from said means upon a predetermined pressure in said circuit.

CHARLES M. KENDRICK.

DISCLAIMER 2,304,831.—*Charles M. Kendrick*, New York, N. Y. FLUID PRESSURE CONTROL. Patent dated Dec. 15, 1942. Disclaimer filed Dec. 26, 1946, by the assignee, *Manly Corporation*.

Hereby enters its disclaimer as follows:

As to claim 2, of every combination of elements therein claimed except such wherein one or more of said chambers is sealed and the hydraulic circuit is closed against the leakage or escape of fluid therefrom by means of flexible sealing elements associated therewith which are flexed upon the variation of the volumetric capacity of the chamber or chambers provided with such flexible sealing elements and seal the chambers against such leakage or escape of fluid notwithstanding the flexing thereof during the manipulation of the control means and the actuation of the control device.

As to claim 4, of every combination of elements therein claimed except such wherein the closed hydraulic circuit is closed and sealed against leakage or escape of fluid therefrom by flexible sealing members operatively associated respectively with the movable element, the means for altering the pressure in the circuit and the means responsive to the operation of said power-operated device.

As to claim 5, of every combination of elements therein claimed except such wherein the closed hydraulic control circuit is closed against the admission of fluid thereto and exhaust of fluid therefrom and the volume of fluid in the circuit is maintained constant during the manipulation of the control means and the operation of the hydraulic power-operated device.

As to claim 6, of every combination of elements therein claimed except such wherein the spring means arranged to maintain a substantially constant predetermined pressure in the closed hydraulic circuit is operatively connected with the control valve means and through the latter is directly responsive to changes in pressure in the closed circuit.

[*Official Gazette February 18, 1947.*]